United States Patent

Moxey

[11] Patent Number: 5,576,275
[45] Date of Patent: Nov. 19, 1996

[54] OIL SOLUBLE POLYALKYLENE GLYCOLS

[75] Inventor: John R. Moxey, Southhampton, England

[73] Assignee: BP Chemicals Limited, London, England

[21] Appl. No.: 377,481

[22] Filed: Jan. 24, 1995

Related U.S. Application Data

[63] Continuation of Ser. No. 938,361, Aug. 31, 1992, abandoned.

[30] Foreign Application Priority Data

Sep. 19, 1991 [GB] United Kingdom .................. 9119291

[51] Int. Cl.$^6$ .................................................. C10M 145/34
[52] U.S. Cl. ...................... 508/562; 508/563; 508/567; 508/580; 508/583; 564/505; 568/50; 568/607; 568/624
[58] Field of Search .................. 252/52 A, 45, 252/48.2, 51.5 R; 564/505; 568/50, 624, 607

[56] References Cited

U.S. PATENT DOCUMENTS

| | | | |
|---|---|---|---|
| 2,677,700 | 5/1951 | Jackson et al. | |
| 4,302,349 | 11/1981 | Kosswig et al. | 252/52 A |
| 4,481,123 | 11/1984 | Hentschel et al. | 252/52 A |
| 4,793,939 | 12/1988 | Mori et al. | 252/51.5 R |
| 4,973,414 | 11/1990 | Nerger et al. | 252/52 A |
| 5,143,640 | 9/1992 | Moxey | 252/52 A |
| 5,426,242 | 6/1995 | Moxey | 568/624 |

FOREIGN PATENT DOCUMENTS

| | | |
|---|---|---|
| 0268920 | 6/1988 | European Pat. Off. |
| 0355977 | 2/1990 | European Pat. Off. |

*Primary Examiner*—Margaret Medley
*Attorney, Agent, or Firm*—Brooks Haidt Haffner & Delahunty

[57] ABSTRACT

A sequential block copolymer of the formula:

$$R^1X\text{—}[(C_yH_{2y}O)_m)C_xH_{2x}O)_n\text{—}H] \quad (I)$$

containing: (i) a moiety $R^1X$ derived from a starter molecule having at least one active hydrogen wherein $R^1X$ is either a $C_{10}$–$C_{24}$ alkyl or a $C_9$–$C_{24}$ alkaryl group, X is O, S or N, (ii) a polymeric block derived from at least one alkylene oxide of formula $C_xH_{x2}O$ wherein x is either 3 or 4, and (iii) a polymeric block derived from at least one alkylene oxide of formula $C_yH_{2y}O$ wherein y is an integer in the range from 12 to 16, and wherein q is 1 when X is O or S, and q is 2 when X is N; and m and n are such that the molecular weight is in the range from 600 to 4000; and the $(C_yH_{2y}O)$ polymeric block derived from the alkylene oxide of formula $C_yH_{2y}O$ forms from 1 to 40% by weight of the copolymer, and the polymeric block derived from the alkylene oxide of formula $C_yH_{2y}O$ constitutes the first polymeric block of the sequential block copolymer and is linked directly to the moiety $R^1X$.

7 Claims, No Drawings

OIL SOLUBLE POLYALKYLENE GLYCOLS

This application is a continuation, of application Ser. No. 07/938,361, filed Aug. 31, 1992 now abandoned.

The present invention relates in general to polyethers and in particular to novel polyethers and their use in industrial or automotive lubricating oil compositions.

Polyethers have been known for a considerable time, as also has their use in lubricating compositions. A problem commonly encountered with polyethers in connection with their use as lubricants, particularly in relation to their use as a component of automotive lubricating oils, is their hydrophilic nature, which manifests itself practically in a tendency to insolubility or immiscibility in admixtures with mineral oils. In recent years, therefore, attempts have been made to develop special polyethers, which are more compatible with mineral oils. Such attempts are apparent from, for example, Japanese laid-open patent application 50-133205(1975) (JA-A-50-133 205), US-A-4,302,349(1981), US-A-4,481,123(1984), EP-A-0 246 612(1987), EP-A-0 293 715(1988) and EP-A-0 355 977(1990).

EP-A-0 246,612 discloses a lubricating oil composition consisting essentially of a paraffinic or naphthenic or a mixture of both types of mineral oils, and 5 to 60% by weight of the composition of a polyalkylene oxide compound of the formula:

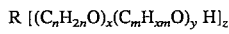

R [(C$_n$H$_{2n}$O)$_x$(C$_m$H$_{2m}$O)$_y$ H]$_z$ wherein

R is the residue of a compound having 1–8 active hydrogen atoms, n is 2–4, m is 6–40, x and y are an integer, and z is 1–8; said polyalkylene oxide compound having a molecular weight of 500 to 100,000 and a C$_6$–C$_{40}$ alkylene oxide content of 15 to 60% by weight of the entire molecule.

In EP-A-0246612 and the other prior art referred to above, the polyether generally is derived from both C$_2$ to C$_4$ alkylene oxide and C$_6$, or greater, oxygen-containing hydrocarbon monomer units. These units can be arranged in either random, block or tapered relationship. In those disclosures pertaining to a block copolymer arrangement, there is no specific mention of a sequential block copolymer derived from the aforesaid units wherein the first polymeric block in the sequence is a block derived from a C$_6$, or greater, oxygen-containing hydrocarbon monomer unit. We have found that such sequential block copolymers can possess improved oil-solubility and improved compatibility with additives commonly employed in lubricating oils.

Accordingly, the present invention provides a sequential block copolymer containing:

(i) a moiety R$^1$X derived from a starter molecule having at least one active hydrogen wherein R$^1$ is either an alkyl or alkaryl group having from 1 to 30 carbon atoms, X is O,S or N, (ii) a polymeric block derived from at least one alkylene oxide of formula C$_x$H$_{2x}$O wherein x is an integer from 2 to 4, and at least 50 mole % of said polymeric block is derived from an alkylene oxide where x is 3 or 4, and (iii) a polymeric block derived from at least one alkylene oxide of formula C$_y$H$_{2y}$O wherein y is an integer in the range from 6 to 30.

characterised in that the sequential block copolymer has the formula:

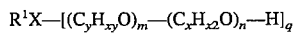

R$^1$X—[(C$_y$H$_{2y}$O)$_m$—(C$_x$H$_{2x}$O)$_n$—H]$_q$  (I)

wherein

R$^1$ X y and x are as defined above, q is 1 when X is O or S, q is 2 when X is N; and m and n are such that the molecular weight is in the range from 600 to 1000 and the (C$_y$H$_{2y}$O) polymeric block (iii) derived from the alkylene oxide of formula C$_y$H$_{2y}$O forms from 1 to 40% by weight of the copolymer and the polymeric block derived from the alkylene oxide of formula C$_y$H$_{2y}$O constitutes the first polymeric block of the sequential block copolymer and is linked directly to the moiety R$^1$X.

An advantage of the copolymers of the invention is that they have improved solubility in lubricating oils, particularly mineral oils. Whilst we do not in any way wish to be bound to any theory, we believe that the improved oil solubility may arise from the improved distribution of the C$_y$H$_{2y}$O units across the molecules and the potential for micelle formation due to the oleophobe/oleophile block structure.

With regard to the starter molecule which is typically a molecule of formula R$^1$X(H)$_q$, R$^1$ is an alkyl or alkaryl group having from 1 to 30 carbon atoms, suitably from 8 to 30 carbon atoms. When R$^1$ is an alkyl group, it is preferably a C$_{10}$ to C$_{24}$ alkyl group, most preferably a C$_{12}$ to C$_{18}$ alkyl group. In the case where R$^1$ is an alkaryl group, it is suitably an alkyl-phenyl group containing from 9 to 24 carbon atoms. A preferred alkaryl group is a phenyl group substituted with one or more C$_6$ to C$_{12}$ alkyl groups. The starter molecule can be either an alcohol, a phenol, a thiol or a primary or secondary amine, or a mixture of two or more of the aforesaid. Examples of starter molecules from which copolymers according to the present invention may be derived include dodecylphenol, dinonylphenol, a C$_{20}$ oxo-alcohol and the propoxylate of a C$_{12}$/C$_{14}$ linear secondary alcohol.

It is preferred that the alkylene oxide of formula C$_x$H$_{2x}$O is propylene oxide. Preferably this polymeric block comprises greater than 50 mole % propylene oxide, more preferably it is substantially completely propylene oxide. As regards the C$_y$H$_{2y}$O units, it is preferred that y is in the range from 12 to 16. Examples of suitable compounds of the formula C$_y$H$_{2y}$O include 1,2-epoxydecane, 1,2-epoxydodecane, 1,2-epoxyhexadecane, 1,2-epoxyoctadecane. Typically, a copolymer of formula (I) may be prepared by reacting in a first step a starter molecule of the formula R$^1$X(R2)q (where R$^1$ and R$^2$ are independently an alkyl or alkaryl group having from 1 to 30 carbon atoms or H, provided at least one of the groups R$^2$ is H, x and q are as defined above), optionally in the presence of a basic or acidic catalyst with the compound of formula C$_y$H$_{2y}$O to form a product comprising a first polymeric block and thereafter in a second step reacting the product of the first step, optionally in the presence of the same or a different catalyst with the alkylene oxide of formula C$_x$H$_{2x}$O to add a second polymeric block. Both of these reaction steps are generally carried out at elevated temperature. Different catalysts may be used in the first and second steps, for example an acidic catalyst in the first step and a basic catalyst in the second step. Examples of suitable acidic catalysts include boron trifluoride, boron trifluoride etherates, such as boron trifluoride diethyletherate, and triethyloxonium tetrafluoroborate. Examples of suitable basic catalysts include sodium or potassium hydroxide, sodium methoxide and sodium ethoxide.

Catalyst residues may be removed by ion-exchange resins or by neutralisation.

In another aspect the present invention provides a lubricant composition comprising a copolymer as hereinbefore described.

The composition may comprise the copolymer as the sole lubricating component. Alternatively, it may incorporate a lubricating oil, which may be either an animal oil, a vegetable oil, a mineral oil or a mixture of oils. Suitably the lubricating oil may be a petroleum-derived lubricating oil, such as a naphthenic base, paraffin base or mixed based oil. Solvent refined oils, for example solvent neutral oils may be employed. The lubricating oil may be present in the composition in an amount in the range from 1 to 99%, preferably from 5 to 85%, by weight based on the weight of the composition. Synlubes can also be used, e.g. polyalphaolefins, polyolesters. A man skilled in the art would be able to establish the relative amounts of the copolymer of the present invention and other components to make the composition fully compatible.

The lubricating oil composition may further comprise optional additives, such as viscosity index improvers, pour point depressants, detergent additives, anti-wear additives, anti-oxidants, anti-corrosion and anti-foam agents.

The presence of a polyether in lubricating oil compositions according to the invention can reduce the viscosity index requirement and enhance lubricity, particularly of synthetic hydrocarbon-containing compositions. It can also beneficially modify the behaviour of the composition to other materials, for example oil seals.

In a preferred embodiment therefore the present invention provides a lubricating oil composition comprising a lubricating oil, a viscosity index improver and a polyether as hereinbefore described.

The lubricating oil compositions as hereinbefore described find application as industrial and automotive lubricants, such as for example automotive crankcase and gearbox lubricants, two-stroke lubricants and industrial gear lubricants.

In a final embodiment the invention provides a process for lubricating the moving parts of industrial plant or of transportation means by applying thereto a lubricating composition as hereinbefore described.

The invention will now be further illustrated by reference to the following Example.

EXAMPLE

In a first step 207 grams of a branched-chain, primary saturated $C_{20}$ alcohol (commercially available as Guerbitol 20 [RTM], ex-Henkel) and 5 grams of boron trifluoride diethyletherate as catalyst was reacted with 293 g of a $C_{16}$ alpha-olefin epoxide (commercially available as Vikolox 16 [RTM], ex Atochem America) at a temperature of 65°–70° C. over 5 hours. The catalyst was then removed.

In a second step 169 grams of the catalyst-free product from the first step, catalysed by adding 0.9 grams of potassium hydroxide and drying to 0.05% wt water, was reacted with 182 grams of propylene oxide over 12 hours at 115°–125° C. Thereafter, the catalyst was removed from the product.

The resulting polyether had a viscosity of 83 cSt at 40° C. It was fully miscible with BP mineral oil BG 470/95 and with a proprietary automotive 15W40 motor oil.

I claim:

1. A sequential block copolymer of the formula:

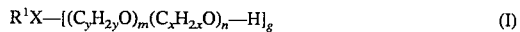

containing (i) a moiety $R^1X$ derived from a starter molecule having at least one active hydrogen wherein $R^1$ is either a $C_{10}$–$C_{24}$ alkyl or a $C_9$–$C_{24}$ alkaryl group, X is O, S or N, (ii) a polymeric block derived from at least one alkylene oxide of formula $C_xH_{2x}O$ wherein x is either 3 or 4, and (iii) a polymeric block derived from at least one alkylene oxide of formula $C_yH_{2y}O$ wherein y is an integer in the range from 12 to 16, and wherein q is 1 when X is O or S, and q is 2 when X is N; and m and n are such that the molecular weight is in the range from 600 to 4000; and the ($C_yH_{2y}O$) polymeric block derived from the alkylene oxide of formula $C_yH_{2y}O$ forms from 1 to 40% by weight of the copolymer, and the polymeric block derived from the alkylene oxide of formula $C_yH_{2y}O$ constitutes the first polymeric block of the sequential block copolymer and is linked directly to the moiety $R^1X$.

2. A copolymer as claimed in claim 1 wherein (ii) is a polymeric block derived from propylene oxide.

3. A copolymer as claimed in either claim 1 or claim 2 wherein $R^1$ is a $C_{10}$ to $C_{24}$ alkyl group.

4. A copolymer as claimed in either claim 1 or claim 2 wherein $R^1$ is a $C_9$ to $C_{24}$ alkyl-phenyl group.

5. A lubricant composition comprising from 1 to 99% by weight of a copolymer as claimed in claim 1 or 2 and from 99 to 1% by weight of a lubricating oil.

6. A lubricant composition as claimed in claim 5 wherein the lubricating oil is a mineral oil or a synthetic lubricating oil.

7. A process for lubricating the moving parts of an industrial plant means or of a transportation means, comprising the step of applying to the moving parts thereof a lubricant composition as claimed in claim 5.

* * * * *

UNITED STATES PATENT AND TRADEMARK OFFICE
CERTIFICATE OF CORRECTION

PATENT NO. : 5,576,275
DATED : November 19, 1996
INVENTOR(S) : JOHN R. MOXEY

It is certified that error appears in the above-indentified patent and that said Letters Patent is hereby corrected as shown below:

In the Abstract, line 7 of same, the formula should read "$C_xH_{2x}O$"

Col. 1, l. 28, formula should read "$R[(C_nH_{2n}O)_x(C_nH_{2m}O)_yH]_z$"

Col. 2, l. 1, formula should read "$R^1X-[(C_yH_{2y}O)_m$"

Col. 2, l. 4, insert a comma (,) after "X" and before "y"

Col. 2, l. 8, "600 to 1000" should read --"from 600 to 4000 --.
Col. 4,
Claim 1, line 2, in the formula (I), change the subscript "g" to --q--

Claim 1, line 9, the formula should read --$C_xH_{2x}O$--

Signed and Sealed this

First Day of April, 1997

*Attest:*

BRUCE LEHMAN

*Attesting Officer*  Commissioner of Patents and Trademarks